United States Patent

Breiter et al.

(10) Patent No.: US 9,820,170 B2
(45) Date of Patent: Nov. 14, 2017

(54) SYSTEM AND METHOD FOR MONITORING WIRELESS COMMUNICATION TERMINALS ON MULTIPLE FREQUENCY CHANNELS

(71) Applicants: Doron Breiter, Palodia Limassol (CY); Victor Cristian Ciochina, Jud. Galati (RO); Constantin Tanasa, Limassol (CY)

(72) Inventors: Doron Breiter, Palodia Limassol (CY); Victor Cristian Ciochina, Jud. Galati (RO); Constantin Tanasa, Limassol (CY)

(73) Assignee: VERINT AMERICAS INC., Alpharetta, GA (US)

( * ) Notice: Subject to any disclaimer, the term of this patent is extended or adjusted under 35 U.S.C. 154(b) by 205 days.

(21) Appl. No.: 14/697,844

(22) Filed: Apr. 28, 2015

(65) Prior Publication Data
US 2016/0323908 A1    Nov. 3, 2016

(51) Int. Cl.
*H04W 24/02* (2009.01)
*H04L 5/00* (2006.01)
*H04W 24/06* (2009.01)

(52) U.S. Cl.
CPC ........... *H04W 24/02* (2013.01); *H04L 5/0005* (2013.01); *H04W 24/06* (2013.01)

(58) Field of Classification Search
None
See application file for complete search history.

(56) References Cited

U.S. PATENT DOCUMENTS

| | | | | |
|---|---|---|---|---|
| 8,295,858 B2 * | 10/2012 | Fox | ........................ | H04K 3/65 455/456.4 |
| 9,402,157 B1 * | 7/2016 | Blaha, Jr. | .............. | H04W 4/023 |
| 2008/0119130 A1 * | 5/2008 | Sinha | .................... | H04W 12/06 455/1 |
| 2008/0198820 A1 * | 8/2008 | Abdel-Kader | ........ | H04W 48/16 370/338 |

(Continued)

FOREIGN PATENT DOCUMENTS

WO    2010/116292    10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Paul H Masur
*Assistant Examiner* — Michael Phillips
(74) *Attorney, Agent, or Firm* — Meunier, Carlin & Curfman

(57) ABSTRACT

A method includes mapping communication activity of wireless communication terminals on a plurality of frequency channels. A schedule of time durations to be spent on the respective frequency channels is defined based on the mapped communication activity. One or more transceivers are controlled to alternate among the frequency channels in accordance with the schedule. On each frequency channel, one or more of the wireless communication terminals are tracked by soliciting the wireless communication terminals to temporarily communicate with at least one of the transceivers during the respective time duration.

26 Claims, 1 Drawing Sheet

(56) References Cited

U.S. PATENT DOCUMENTS

| | | | | |
|---|---|---|---|---|
| 2010/0110949 A1* | 5/2010 | Lundsgaard | ......... | H04W 48/16 370/311 |
| 2012/0220248 A1* | 8/2012 | Kanda | .................. | H04W 48/16 455/150.1 |
| 2013/0163505 A1* | 6/2013 | Lysejko | ............... | H04W 72/12 370/315 |
| 2014/0050210 A1* | 2/2014 | Waters | .................... | H04W 4/02 370/338 |
| 2014/0162681 A1* | 6/2014 | Noonan | ............... | H04W 4/021 455/456.1 |
| 2015/0327044 A1* | 11/2015 | Shah | .................... | H04W 48/16 455/434 |
| 2016/0055322 A1* | 2/2016 | Thomas | .................. | G06F 21/10 726/7 |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Girardin, F., et al., "Detecting air travel to survey passengers on a worldwide scale," Journal of Location Based Services, 2010, 26 pages.

Meyer, U., et al., "On the Impact of GSM Encryption and Man-in-the-Middle Attacks on the Security of Interoperating GSM/UMTS Networks," IEEE, 2004, 8 pages.

Strobel, D., "IMSI Catcher," Seminararbeit, Ruhr-Universitat Bochum, 2007, pp. 13-24.

Vedaldi, A., "An implementation of SIFT detector and descriptor," University of California at Los Angeles, 2007, 7 pages.

\* cited by examiner

SYSTEM AND METHOD FOR MONITORING WIRELESS COMMUNICATION TERMINALS ON MULTIPLE FREQUENCY CHANNELS

FIELD OF THE DISCLOSURE

The present disclosure relates generally to wireless network monitoring, and particularly to methods and systems for monitoring over multiple frequency channels.

BACKGROUND OF THE DISCLOSURE

Various types of monitoring systems are used for tracking and/or collecting information on cellular phones or other wireless communication terminals. Some monitoring systems solicit a tracked terminal to reveal its International Mobile Subscriber Identifier (IMSI). Such systems are commonly referred to as "IMSI catchers."

Examples of IMSI catching techniques are described, for example, by Strobel in "IMSI Catcher," Jul. 13, 2007, by Asokan et al., in "Man-in-the-Middle Attacks in Tunneled Authentication protocols," the 2003 Security Protocols Workshop, Cambridge, UK, Apr. 2-4, 2003, and by Meyer and Wetzel in "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, Barcelona, Spain, Sep. 5-8, 2004, pages 2876-2883, which are all incorporated herein by reference.

SUMMARY OF THE DISCLOSURE

An embodiment that is described herein provides a method including mapping communication activity of wireless communication terminals on a plurality of frequency channels. A schedule of time durations to be spent on the respective frequency channels is defined based on the mapped communication activity. One or more transceivers are controlled to alternate among the frequency channels in accordance with the schedule. On each frequency channel, one or more of the wireless communication terminals are tracked by soliciting the wireless communication terminals to temporarily communicate with at least one of the transceivers during the respective time duration.

In some embodiments, defining the schedule further includes defining transmission parameters to be used by the transceivers on the respective frequency channels. In some embodiments, mapping the communication activity includes monitoring first-time interceptions of wireless communication terminals on a given frequency channel, and defining the schedule includes setting a time duration to be spent on the given frequency channel based on the first-time interceptions.

In an example embodiment, monitoring the first-time interceptions includes measuring a rate of the first-time interceptions, and defining the schedule includes setting the time duration based on the rate. In an embodiment, measuring the rate includes measuring a length of time after which the rate of the first-time interceptions drops below a predefined threshold, and defining the schedule includes setting the time duration based on the measured length of time.

In another embodiment, mapping the communication activity includes estimating a number of base stations that are active on a given frequency channel, and defining the schedule includes setting a time duration to be spent on the given frequency channel based on the number of base stations. In yet another embodiment, mapping the communication activity includes detecting a given frequency channel on which the communication activity is below a predefined level, and defining the schedule includes omitting the given frequency channel from one or more subsequent iterations of the schedule.

In still another embodiment, defining the schedule includes configuring the schedule depending on a number of the transceivers. In a disclosed embodiment, defining the schedule includes configuring the schedule depending on a number of wireless networks with which the wireless communication terminals communicate. In another embodiment, defining the schedule includes configuring the schedule depending on a number of Radio Access Technologies (RATs) used by the wireless communication terminals.

In some embodiments, defining the schedule includes defining at least first and second different schedules, and choosing between the different schedules based on a selection criterion. In an embodiment, defining the schedule includes modifying one or more transmission parameters of the transceivers between first and second iterations of the schedule. In some embodiments, tracking the terminals includes soliciting a given terminal while a user of the terminal conducts a financial transaction, and detecting a suspected fraud event by comparing a first identity of the user conducting the transaction with a second identity of the given terminal.

There is additionally provided, in accordance with an embodiment that is described herein, a system including one or more transceivers and a processor. The processor is configured to map communication activity of wireless communication terminals on a plurality of frequency channels using the transceivers, to define, based on the mapped communication activity, a schedule of time durations to be spent on the respective frequency channels, to control the transceivers to alternate among the frequency channels in accordance with the schedule and to track one or more of the wireless communication terminals on each frequency channel by soliciting the wireless communication terminals to temporarily communicate with at least one of the transceivers during the respective time duration.

The present disclosure will be more fully understood from the following detailed description of the embodiments thereof, taken together with the drawings in which:

DETAILED DESCRIPTION OF EMBODIMENTS

Overview

Embodiments that are described herein provide improved methods and systems for monitoring wireless communication terminals, such as mobile phones. In the disclosed embodiments, a monitoring system is configured to imitate the operation of a base station, and to solicit wireless communication terminals to establish communication with the monitoring system in order to monitor and track them.

In many practical scenarios, the wireless terminals in the area of interest operate on multiple frequency channels, sometimes on multiple frequency bands and/or with multiple wireless networks. Dedicating a full-fledged monitoring system to each frequency channel is extremely costly and often unfeasible.

In some embodiments that are described herein, the monitoring system comprises one or more transceivers that alternate among the various frequency channels in accordance with a periodic channel-switching schedule. The parameters of the schedule, e.g., the time duration to be spent on each frequency channel, is typically defined adaptively based on the actual communication activity per channel.

In a typical embodiment, when initially deployed, the monitoring system maps the communication activity on the various frequency channels, and then defines the channel-switching schedule based on the mapping. The system alternates among the frequency channels in accordance with the schedule, and monitors each frequency channel for the specified time duration. The system may update the channel-switching schedule in response to changes in the communication activity that occur over time.

Several example measures of communication activity, and several example criteria for specifying the time durations for the various frequency channels, are described herein. In addition to communication activity, the schedule may also depend, for example, on the number of transceivers in the monitoring system and/or on the number of wireless networks whose terminals are being monitored.

Controlling the parameters of the channel-switching schedule enables the system to set various performance trade-offs. For example, the schedule may be optimized for speed, at the expense of possible degradation in detection probability, by setting short time durations. Detection probability can be maximized by setting long durations.

The methods and systems described herein enable the monitoring system to optimize its resource allocation based on the actual communication activity in the area of interest. As a result, a relatively small number of transceivers can be used for monitoring a large number of wireless terminals on a large number of frequency channels, with little or no degradation in monitoring performance.

System Description

Figure 1:
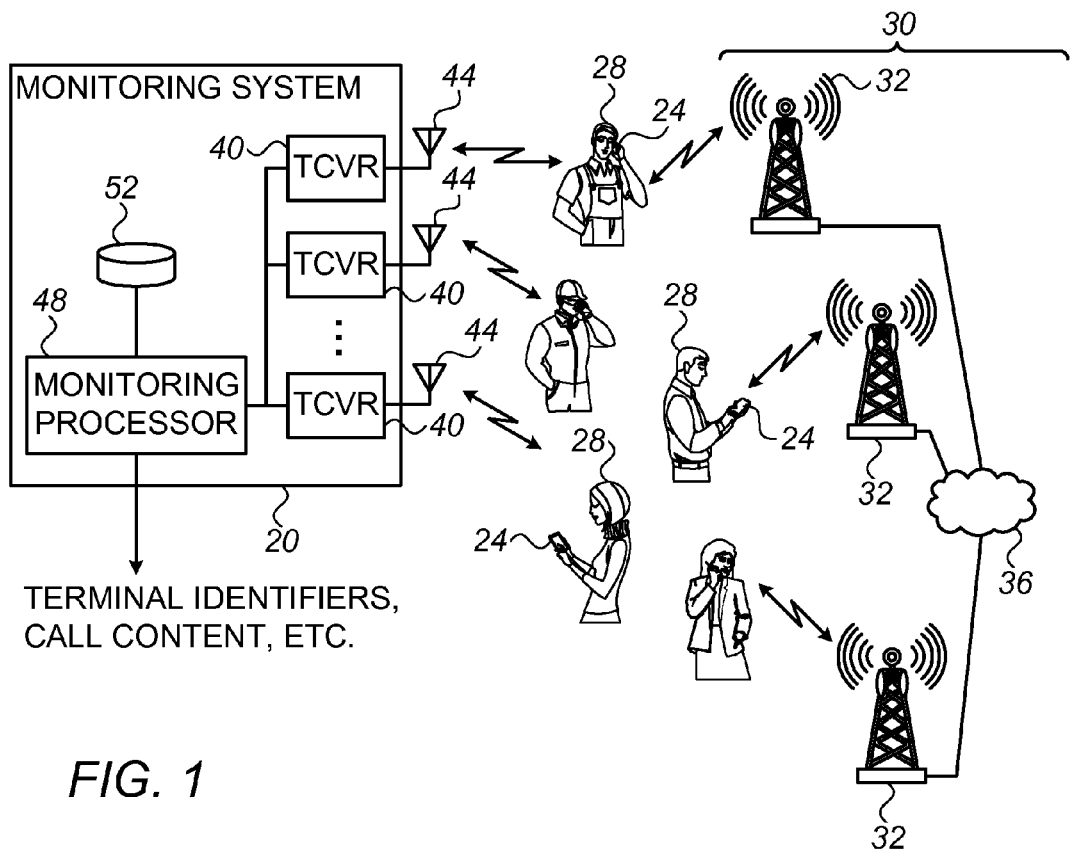
FIG. 1 is a block diagram that schematically illustrates a system for monitoring wireless communication terminals, in accordance with an embodiment that is described herein.

FIG. 1 is a block diagram that schematically illustrates a system 20 for monitoring wireless communication terminals 24, in accordance with an embodiment that is described herein. Terminals 24 are operated by users 28, and communicate with a wireless network 30. System 20 may be used, for example, by network operators for monitoring their subscriber activity or network performance, or by law enforcement agencies for monitoring of users of interest.

Terminals 24 may comprise, for example, cellular phones, smartphones, wireless-enabled mobile computing devices, or any other suitable type of terminals. Network may operate in accordance with any suitable communication protocol, such as, for example, Global System for Mobile telecommunication (GSM), Universal Mobile Telecommunication System (UMTS), Code-Division Multiple Access (CDMA), iDEN, WiMAX (IEEE 802.16), Long-Term Evolution (LTE), or any other suitable protocol. Wireless network 30 comprises base stations 32 and a core network 36. Terminals 24 communicate with network 30 by transmitting uplink signals to base stations 32 and receiving downlink signals to the base stations.

In some embodiments, monitoring system 20 comprises one or more transceivers (transmitters-receivers) 40, a monitoring processor 48 and a monitoring database 52. Each transceiver 40 is configured to tune to a desired frequency channel and to monitor terminals 24 on that channel using a suitable antenna 44. Processor 48 is configured, among other tasks, to define and apply a periodic channel-switching schedule that specifies how transceivers 40 alternate among frequency channels. Database 52 may be used, for example, for storing the schedule, monitoring results such as terminal identifiers or call content, and/or any other suitable information. The monitoring results may be output to an operator or to some external system.

The system configuration shown in FIG. 1 is an example configuration that is chosen purely for the sake of conceptual clarity. In alternative embodiments, any other suitable system configuration can be used. For example, the figure shows three transceivers 40 by way of example, but system 20 may generally comprise any suitable number of transceivers, or even a single transceiver.

Certain elements of system 20 can be implemented using hardware, such as using one or more Application-Specific Integrated Circuits (ASICs), Field-Programmable Gate Arrays (FPGAs), Digital Signal Processors (DSPs) or other device types. Additionally or alternatively, certain elements of system 20 can be implemented using software, or using a combination of hardware and software elements. Database 52 may comprise any suitable volatile and/or non-volatile storage device. In some embodiments, processor 48 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

On a given frequency channel, a given transceiver 40 of system 20 solicits terminals 24 to communicate with the transceiver, by imitating the operation of a base station. Transceiver 40 may solicit a terminal to communicate in various ways, which may depend on the wireless protocol or protocols, supported by the terminal and the transceiver.

In GSM networks, for example, the terminal measures the signals transmitted by base stations that are within range, and maintains a list of base stations that are candidates for hand-off. The terminal may decide to switch from its current serving base station to another base station based on various criteria, such as based on signal strength and/or on pre-defined priorities assigned to the base stations.

In some embodiments, transceiver 40 may solicit a terminal 24 by transmitting at a high power level and/or using a directional antenna, so that the transceiver's transmission will be received by the terminal at higher signal strength and/or better signal quality than base stations 32 of network 30. In such cases, the terminal is likely to attempt reselection to the transceiver. In alternative embodiments, the different base stations are assigned priorities, and the terminal chooses the serving base station in accordance with their power and priorities. In these embodiments, the transceiver may be configured to imitate a base station having higher priority than base stations 32 of network 30 in order to solicit the terminal.

Having solicited a given terminal to communicate, system 20 (processor 48 or transceiver 40) extracts information regarding the solicited terminal. Such information may comprise, for example, the International Mobile Subscriber Identity (IMSI), Temporary Mobile Subscriber Identity (TMSI) and/or International Mobile Equipment Identity (IMEI) of the terminal, a time stamp indicating the time at which communication took place, call content, SMS content and/or any other suitable information.

Monitoring of Multiple Frequency Channels Using Adaptive Channel-Switching Schedule In many practical cases, terminals 24 operate on multiple frequency channels, possibly on multiple frequency bands and possibly belonging to multiple wireless networks. In the embodiments described herein, transceivers 40 monitor terminals 24 by alternating among the frequency channels in accordance with a channel-switching schedule specified by processor 48, and soliciting terminals 24 on each channel.

The embodiments described herein refer mainly to GSM networks, in which cell reselection is based on cell reselection. The disclosed techniques are highly suitable and effective in UMTS networks, in which a terminal typically does not begin the reselection process as long as the serving cell has adequate service level. Thus, in order to solicit a UMTS terminal, it is not sufficient to transmit a strong signal on a given channel. Rather, it is typically necessary to transmit on the same frequency channel (the same UARFCN, not only the same band) as the current serving cell, so as to degrade the service quality of the serving cell. The disclosed techniques achieve this goal, since transceivers 40 transmit alternately on the various frequency channels used by the terminals.

Among other parameters, the channel-switching schedule specified by processor 48 specifies the length of time to be spent by transceivers 40 on each frequency channel. The time duration may differ from one channel to another, e.g., depending on the extent of communication activity on each channel. Processor 48 typically specifies longer time durations for frequency channels that serve large numbers of active terminals, and vice versa.

Typically, system 20 carries out an initial mapping phase in which the system maps the extent of communication activity on the various frequency channels. Processor 48 then defines the schedule, and specifically the initial time duration to be spent on each frequency channel, based on the mapped activity.

In some embodiments, processor 48 aims to set the time duration for each frequency channel so that transceiver 40 will capture at least most of the terminals active on that channel. An exceedingly short time duration will degrade the probability of capturing new terminals on the channel. An exceedingly long time duration will waste time and possibly degrade the probability of capturing new terminals on other channels. The optimum time duration should therefore be long enough for capturing at least most of the active terminals on the channel, but not longer.

Processor 48 may use various techniques for estimating the communication activity on a given frequency channel, and various criteria for specifying the time duration for the channel based on the estimated activity.

In some embodiments, processor 48 estimates the level of communication activity on a given channel based on "first-time interception" events. A "first-time interception" is defined as detection of a terminal that was not yet detected on the current visit of system 20 to the channel in question.

During the mapping phase, system 20 typically tunes to a given frequency channel and starts transmitting and soliciting terminals to communicate. When a certain terminal is solicited successfully and attempts to switch to system 20, system 20 connects to the terminal, extracts its identifiers or other information, and records this event as a first-time interception. The terminal is then handed back to network 30. If the same terminal will attempt to switch to system 20 again during the same visit of system 20 to the given channel, system 20 would typically reject the attempt.

The number of first-time interceptions on a given frequency channel is indicative of the number of different terminals active on the channel, and therefore it makes a good criterion for setting the time duration to be spent on the channel.

In some embodiments, processor 48 sets the time duration to be spent on a given channel based on the rate of first-time interceptions measured on that channel, e.g., based on the number of first-time interception events occurring in a certain time period. Channels having a high rate of first-time interceptions will typically be assigned long time duration, and vice versa.

In some embodiments, processor 48 sets the time duration to be spent on a given channel based on the length of time needed for the rate of first-time interceptions to drop below some predefined threshold. Such a criterion aims to find the time duration after which only few terminals are undetected.

In an example scenario, processor 48 initially allocates a duration of forty seconds to a given channel. Subsequently, processor 48 may monitor the rate of first-time interceptions, e.g., every ten seconds. If and when the rate of first-time interceptions falls below 20% of the initial rate of first-time registration, processor 48 may decide to move the transceiver to another channel, possibly on another band and/or network.

In another example scenario, processor 48 initially allocates a duration of 30-60 seconds to a given channel. Subsequently, processor 48 continuously monitors the rate of first-time interceptions, e.g., at intervals of 5-10 seconds. If and when the number of first-time interceptions falls below two new first-time registration, processor 48 may decide to move the transceiver to another channel. The scenarios above are depicted purely by way of example, and any other scenarios and/or numerical values can be used in alternative embodiments.

Additionally or alternatively, processor 48 may set the time duration to be spent on a given channel based on the number of different base stations with which the monitored terminals communicate on that channel.

In an embodiment, if system 20 detect no communication activity of a given frequency channel (or at least a level of activity that is below some predefined threshold), processor 48 may omit this channel from one or more subsequent iterations of the periodic schedule. Typically, processor 48 revisits this decision and re-monitors the omitted channel at a later time, and re-introduces the channel into the schedule if it becomes active.

The criteria described above are example criteria that are depicted purely for the sake of conceptual clarity. In alternative embodiments, processor 48 may specify the time duration to be spent on each frequency channel in any other suitable manner.

In addition to setting the time duration to be spent on each channel, processor 48 may also set transmission parameters to be used by transceivers 40 on each channel. This setting is also considered part of the schedule. Transmission parameters may comprise, for example, transmit power level, broadcast parameters, and/or any other suitable parameters. The use of this technique is demonstrated further below.

In addition to communication activity mapping, processor 48 may define the channel-switching schedule depending on additional factors. One possible factor is the number of transceivers 40 in system 20. A system having N transceivers 40 is capable of monitoring N frequency channels simultaneously. The schedule may define this parallelism, e.g., which transceivers are to be tuned to which channels as a function of time. Another possible factor that may affect the schedule is the number of different wireless networks 30 with which terminals 24 communicate. Yet another possible factor that may affect the schedule is the number of different types of networks, i.e., different Radio Access Technologies (RATs), used by the terminals, e.g., 2G, 3G, 4G, iDEN, CDMA, WiMAX or Wi-Fi.

Figure 2:
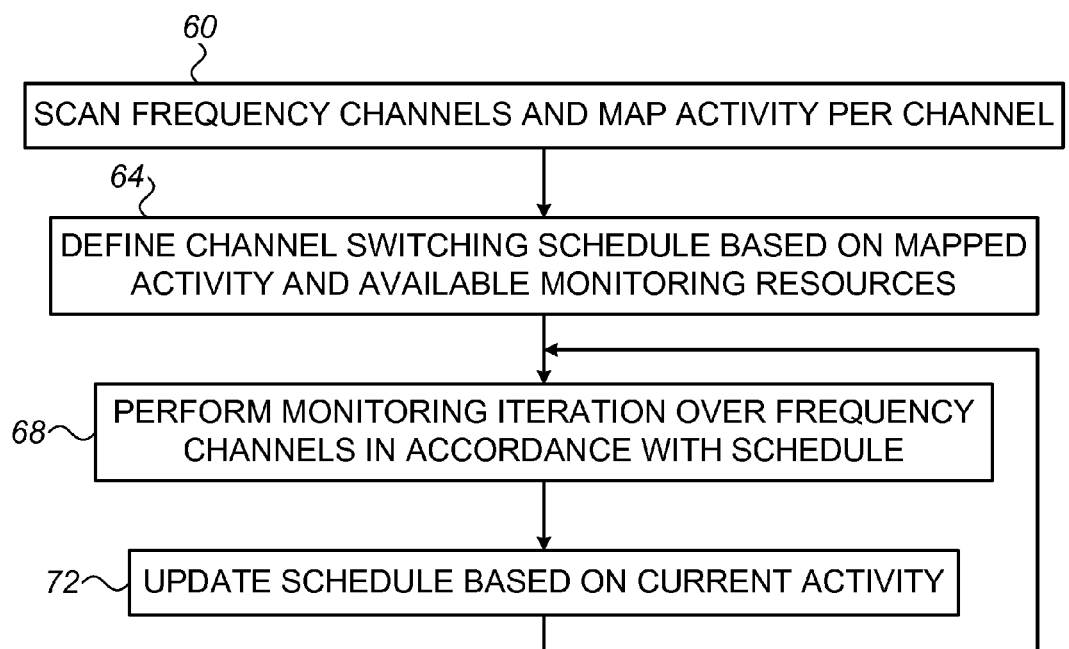
FIG. 2 is a flow chart that schematically illustrates a method for monitoring wireless communication terminals, in accordance with an embodiment that is described herein.

FIG. 2 is a flow chart that schematically illustrates a method for monitoring wireless communication terminals 24, in accordance with an embodiment that is described herein. The method begins with system 20 scanning the various frequency channels and mapping the communication activity per channel, at a mapping step 60. Processor 48 defines a periodic channel-switching schedule based on the mapping, at a schedule definition step 64.

At a monitoring step 68, system 20 carries out an iteration (period) of the periodic schedule. In each iteration, transceivers 40 visit each frequency channel in accordance with the schedule and monitor the terminals active on each channel.

At a channel updating step 72, processor 48 may update the schedule to account for changes in the communication activity that occurred since the mapping phase. For example, processor 48 may lengthen the time durations of channels on which communication activity has increased, and vice versa. The method then loops back to step 68 above, in which system 20 performs the next iteration of the schedule.

Additional Trade-Offs and Variations

In some embodiments, it is possible to configure the channel-switching schedule so as to optimize the performance of system 20 in different ways or to match different requirements.

Consider, for example, a tactical deployment of system 20 in an area of interest, which is required to detect as many terminals as possible in a short time frame. To match this requirement, the schedule may be configured with relatively short time durations.

In contrast, consider another deployment of system 20 in a prison environment, for detecting mobile phones that are operated illegally by prisoners. In the latter environment, speed is less of an issue, and therefore the schedule may be configured with long time durations in order to maximize detection probability.

In some embodiments, system 20 may be configured with two or more different schedules. Processor 48 may choose and apply the appropriate schedule, or switch between schedules over time, as desired. Any suitable criterion can be used for selecting the appropriate schedule.

In some embodiments, the schedule may also specify variations in the transmission parameters of transceivers 40 over time. For example, reducing the transmit power of transceivers 40 would reduce the geographical region in which terminals would be solicited successfully to switch to system 20. Increasing the transmit power of transceivers 40 would enlarge this region.

Processor 48 may configure transceivers 40 to operate with different transmission parameters (e.g., transmit power level and/or broadcast parameters) so as to filter the solicited terminals based on their distance from system 20. Processor 48 may update the transmission parameters on subsequent cycles of the schedule (and therefore on subsequent visits to a channel), in order to solicit terminals from a progressively-increasing distance to connect to system 20. This technique may be combined with setting the time duration to be spent on a given channel in order to enable the operator of system 20 to choose a faster process for close range or a slower but more reliable method for maximum range.

In an example embodiment, processor 48 performs a first iteration of the schedule using low transmit power, in order to quickly identify the terminals that are close to system 20. Subsequent iterations of the schedule may be performed with a higher transmit power, so as to solicit more distant terminals, as well. In an embodiment, processor 48 may configure the first iteration with relatively short time durations, and increase the time durations in the subsequent iterations.

The above technique is depicted purely by way of example, in order to demonstrate the flexibility provided by controlling the schedule parameters. In alternative embodiments, the schedule may be adapted in any other suitable way.

In alternative embodiments, the disclosed techniques can be used for various other applications. For example, system 20 may be used to permanently downgrade solicited terminals from one RAT to another RAT having weaker encryption (e.g., from 3G to 2G, or from 4G to 2G or 3G). After downgrading, it is simpler (for system 20 or for another system) to decrypt communication sessions conducted by the terminals.

As another example, the disclosed techniques can be used for implementing a portable multi-band, multi-RAT, multi-operator monitoring system having an extremely small form factor, e.g., pocket-size. Such a system may comprise, for example, a single transceiver 40 that uses low transmit power and a schedule comprising short time durations. As yet another example, system 20 may be implemented on board an aircraft, e.g., an Unmanned Aerial Vehicle (UAV).

In other embodiments, system 20 can be used for fraud prevention. In such an embodiment, system 20 may be installed at a location in which individuals carry out financial transactions, e.g., near an Automated Teller Machine (ATM). The system is used for measuring the location of a user's terminal (e.g., phone) as the user is carrying out a financial transaction at the ATM. The terminal identity can be compared to the identity of the ATM card owner. A mismatch between the two identities may be indicative of fraud. In an embodiment, the ATM may send system 20 information regarding the individual performing the transaction. System 20 may use this information to select the appropriate service provider, and thus search the relevant networks and/or bands.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
mapping communication activity of wireless communication terminals on a plurality of frequency channels;
based on the mapped communication activity, defining a schedule of time durations to be spent on the respective frequency channels;
controlling one or more transceivers to alternate among the frequency channels in accordance with the schedule;
on each frequency channel, tracking one or more of the wireless communication terminals by soliciting the wireless communication terminals to temporarily communicate with at least one of the transceivers during the respective time duration;
soliciting a given terminal while a user of the terminal conducts a financial transaction; and
detecting a suspected fraud event by comparing a first identity of the user conducting the transaction with a second identity of the given terminal.

2. The method according to claim 1, wherein defining the schedule further comprises defining transmission parameters to be used by the transceivers on the respective frequency channels.

3. The method according to claim 1, wherein mapping the communication activity comprises monitoring first-time interceptions of wireless communication terminals on a given frequency channel, and wherein defining the schedule comprises setting the time duration to be spent on the given frequency channel based on the first-time interceptions.

4. The method according to claim 3, wherein monitoring the first-time interceptions comprises measuring a rate of the first-time interceptions, and wherein defining the schedule comprises setting the time duration based on the rate.

5. The method according to claim 4, wherein measuring the rate comprises measuring a length of time after which the rate of the first-time interceptions drops below a predefined threshold, and wherein defining the schedule comprises setting the time duration based on the measured length of time.

6. The method according to claim 1, wherein mapping the communication activity comprises estimating a number of base stations that are active on a given frequency channel, and wherein defining the schedule comprises setting the time duration to be spent on the given frequency channel based on the number of base stations.

7. The method according to claim 1, wherein mapping the communication activity comprises detecting a given frequency channel on which the communication activity is below a predefined level, and wherein defining the schedule comprises omitting the given frequency channel from one or more subsequent iterations of the schedule.

8. The method according to claim 1, wherein defining the schedule comprises configuring the schedule depending on a number of the transceivers.

9. The method according to claim 1, wherein defining the schedule comprises configuring the schedule depending on a number of wireless networks with which the wireless communication terminals communicate.

10. The method according to claim 1, wherein defining the schedule comprises configuring the schedule depending on a number of Radio Access Technologies (RATs) used by the wireless communication terminals.

11. The method according to claim 1, wherein defining the schedule comprises defining at least first and second different schedules, and choosing between the different schedules based on a selection criterion.

12. The method according to claim 1, wherein defining the schedule comprises modifying one or more transmission parameters of the transceivers between first and second iterations of the schedule.

13. A system, comprising:
one or more transceivers; and
a processor, which is configured to:
map communication activity of wireless communication terminals on a plurality of frequency channels using the transceivers,
define, based on the mapped communication activity, a schedule of time durations to be spent on the respective frequency channels,
control the transceivers to alternate among the frequency channels in accordance with the schedule,
track one or more of the wireless communication terminals on each frequency channel by soliciting the wireless communication terminals to temporarily communicate with at least one of the transceivers during the respective time duration,
control the transceivers to solicit a given terminal while a user of the terminal conducts a financial transaction, and
detect a suspected fraud event by comparing a first identity of the user conducting the transaction with a second identity of the given terminal.

14. The system according to claim 13, wherein the processor is configured to define transmission parameters to be used by the transceivers on the respective frequency channels.

15. The system according to claim 13, wherein the processor is configured to monitor first-time interceptions of wireless communication terminals on a given frequency channel, and to set a time duration to be spent on the given frequency channel based on the first-time interceptions.

16. The system according to claim 15, wherein the processor is configured to measure a rate of the first-time interceptions, and to set the time duration based on the rate.

17. The system according to claim 16, wherein the processor is configured to measure a length of time after which the rate of the first-time interceptions drops below a predefined threshold, and to set the time duration based on the measured length of time.

18. The system according to claim 13, wherein the processor is configured to estimate a number of base stations that are active on a given frequency channel, and to set the time duration to be spent on the given frequency channel based on the number of base stations.

19. The system according to claim 13, wherein the processor is configured to detect a given frequency channel on which the communication activity is below a predefined level, and to omit the given frequency channel from one or more subsequent iterations of the schedule.

20. The system according to claim 13, wherein the processor is configured to define the schedule depending on a number of the transceivers.

21. The system according to claim 13, wherein the processor is configured to define the schedule depending on a number of wireless networks with which the wireless communication terminals communicate.

22. The system according to claim 13, wherein the processor is configured to define the schedule depending on a number of Radio Access Technologies (RATs) used by the wireless communication terminals.

23. The system according to claim 13, wherein the processor is configured to define at least first and second different schedules, and to choose between the different schedules based on a selection criterion.

24. The system according to claim 13, wherein the processor is configured to modify one or more transmission parameters of the transceivers between first and second iterations of the schedule.

25. A method, comprising:
mapping communication activity of wireless communication terminals on a plurality of frequency channels, wherein the mapping comprises monitoring first-time interceptions of wireless communication terminals on a given frequency channel;
measuring a rate of the first-time interceptions, to measure a length of time after which the rate of the first-time interceptions drops below a predetermined threshold;
based on the mapped communication activity, defining a schedule of time durations to be spent on the respective frequency channels, wherein the time duration to be spent on the given frequency channel is based on the measured length of time;
controlling one or more transceivers to alternate among the frequency channels in accordance with the schedule; and
on each frequency channel, tracking one or more of the wireless communication terminals by soliciting the wireless communication terminals to temporarily communicate with at least one of the transceivers during the respective time duration.

26. A system, comprising:
one or more transceivers; and
a processor, which is configured to:
map communication activity of wireless communication terminals on a plurality of frequency channels using the transceivers, wherein the mapping comprises monitoring first-time interceptions of wireless communication terminals on a given frequency channel,
measure a rate of the first-time interceptions to measure a length of time after which the rate of the first-time interceptions drops below a predefined threshold,
define, based on the mapped communication activity, a schedule of time durations to be spent on the respective frequency channels, wherein the time duration to be spent on the given frequency channel is based on the measured length of time,
control the transceivers to alternate among the frequency channels in accordance with the schedule, and
track one or more of the wireless communication terminals on each frequency channel by soliciting the wireless communication terminals to temporarily communicate with at least one of the transceivers during the respective time duration.

* * * * *